Dec. 10, 1957 R. J. WILKIE ET AL 2,815,562
POWER SAW WITH IMPROVED COOLANT APPLICATOR
Filed Jan. 30, 1956
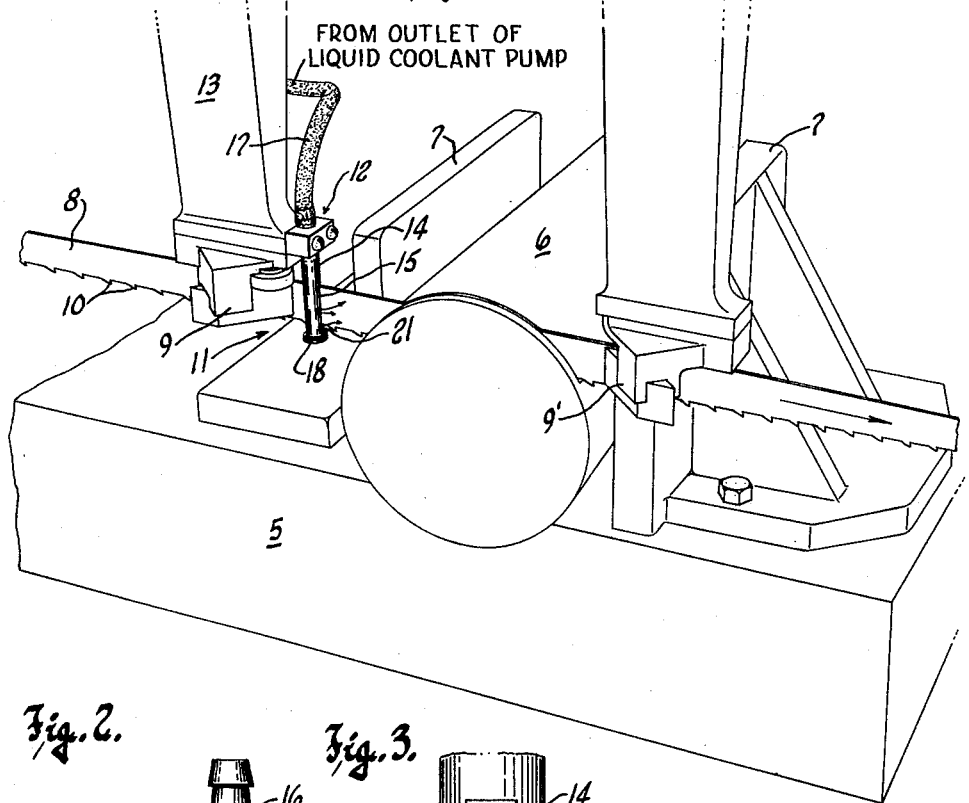
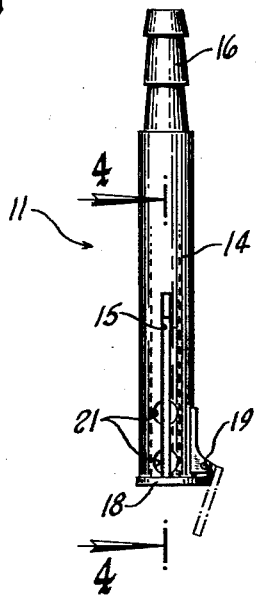
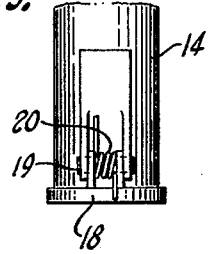
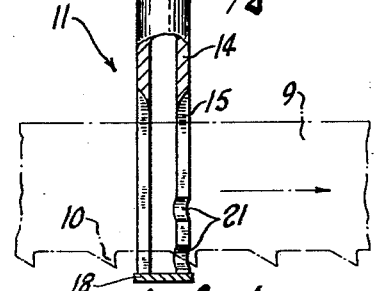
Inventors
Robert J. Wilkie
Laurence L. Cruise

United States Patent Office 2,815,562
Patented Dec. 10, 1957

2,815,562

POWER SAW WITH IMPROVED COOLANT APPLICATOR

Robert J. Wilkie, Minneapolis, Minn., and Laurence L. Cruise, Prospect Heights, Ill., assignors to Continental Machines, Inc., Savage, Minn., a corporation of Minnesota Application January 30, 1956, Serial No. 562,290

2 Claims. (Cl. 29—68)

This invention relates to saw bands of the type employed in cutoff saws such as that forming the subject matter of the copending application of Robert L. Crane, Serial No. 533,786, filed September 12, 1955; and refers more particularly to an improved coolant applicator for such machine tools by which liquid coolant is brought to the cutting zone.

Heretofore it has been customary to apply the coolant by means of a nozzle positioned to direct the stream or spray issuing therefrom either against the saw or into the kerf being cut thereby, but that manner of applying the coolant apparently did not bring enough coolant to the exact point of cutting action, and accordingly, the cooling was not as effective as it might be.

The present invention, therefore, has as its purpose to provide a coolant applicator for machine tools of the power saw type, which overcomes the aforesaid objection by so directing the coolant onto the saw band or blade as to assure an adequate supply of coolant being positively carried directly to the point of cutting action.

More specifically, it is an object of this invention to provide an improved coolant applicator for power saws which is so constructed that the saw band or blade actually travels through a bath of liquid coolant just before it reaches the cutting zone.

Still another object of this invention is to provide a liquid coolant applicator for power saws which will positively direct an ample flow of coolant into the gullets of the saw as it enters the work zone.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiments of the invention constructed according to the best mode so far devised for the practical application of the principles thereof, and in which:

Figure 1 is a perspective view of a portion of a band type cutoff saw with the coolant applicator of this invention mounted thereon;

Figure 2 is a front view of the applicator shown detached from the machine;

Figure 3 is a side view of the lower portion of the applicator; and

Figure 4 is a longitudinal sectional view through the lower portion of the applicator and illustrating the manner in which the applicator accommodates the saw band.

Referring now particularly to the accompanying drawing, the numeral 5 designates the base or work support of a power saw which for purposes of illustration may be a band type cutoff saw used to cut bar stock 6 into predetermined lengths or slabs. The aforesaid copending application of Robert L. Crane illustrates such a cutoff saw. The stock to be cut rests upon the base 5 and is held in position thereon by being clamped between vice jaws 7, at least one of which is moveable toward the other. The saw band 8 is guided for endwise travel through the work zone by means of guides 9 and 9' suitably supported from an overhead carrier frame (not shown) and as is customary in endless band cutoff machines, the saw band is mounted upon spaced pulley wheels (not shown) at least one of which is driven to draw the band endwise through the work zone.

The lower edge of the band of course, has cutting teeth 10, and if the heat developed during the cutting action is to be effectually carried off, it is important that this lower toothed edge of the band be adequately cooled as it acts upon the work. This objective is admirably achieved by the coolant applicator of this invention and which is designated generally by the numeral 11. The path of travel of the saw band is to the right as viewed in Figure 1. Hence, the coolant applicator 11 is mounted between the saw guide 9 and the work zone, or in other words, upstream from the work zone. In fact, the coolant applicator is mounted as at 12 upon the support 13, which carries the guide 9.

The applicator broadly comprises a discharge nozzle having an inlet and spaced apart legs which straddle the saw band and have discharge openings facing inwardly and extending lengthwise of the legs for the full width of the saw band therebetween so that liquid coolant issuing from the discharge openings bathes the saw band across its entire width as the band travels therebetween. More specifically, the applicator in its present embodiment, consists essentially of a tube 14 having a slit 15 extending longitudinally in from one end thereof and disposed diametrically across the tube. The slitted end of the tube faces downwardly and the tube is so held by its mounting 12 that its slit 15 is in line with the path of travel of the saw band and has the saw band received therein with the lower toothed edge 10 of the band upwardly of the lower end of the tube. It should be understood that the slit 15 is long enough to accommodate the full width of the band and wide enough to accommodate its toothed edge.

The upper end 16 of the tube is formed to have a hose 17 applied thereto, which hose (as indicated in Figure 1) leads from the outlet of a liquid coolant pump or other source of liquid coolant under pressure.

The lower end of the tube is closed by a cap or cover 18 moveable to and from its closed position and to this end preferably hinged to the tube as at 19. A torsion spring 20 yieldingly holds the cap or cover 18 in its closed position. Obviously, this manner of mounting the cap or cover enables saw bands to be inserted into the slit 15, as when replacing a broken band.

At its upstream side the slit 15 is of uniform width but at its downstream side it is preferably increased in width near the bottom of the tube, as by notches 21 in the sides of the slit. These notches may be formed by drilling holes into the tube at the appropriate places.

In operation, liquid coolant under pressure is fed to the tube 14 at a rate to keep the same full so that the saw band travels through a bath of the coolant and carries the coolant with it. It might be said that the saw band becomes plated or soaked with liquid coolant just before it enters the work zone, and this desirable result is further assured by the enlargements 21 in the downstream side of the slit. Most important, however, is the fact that the cap or cover directs the liquid coolant upwardly against the toothed edge of the saw band and thereby assures that the gullets of the saw are filled with the coolant.

Tests have shown that the applicator of this invention increases the cutting life of a saw band as much as four times, compared to the old conventional method of directing a stream of coolant against the work and saw by means of a nozzle. In the tests referred to, the band of a cutoff saw operating with a band speed of 250 feet per minute, and cutting a 6" diameter bar of 1020 CRS and using a soluble type oil coolant, was able to cut as much as 20,000 square inches; whereas the same kind of band on the same machine but with a nozzle type applicator could be used to cut only 5,000 square inches.

Another advantage of the applicator of this invention is that it makes possible the substitution of a cheaper soluble oil for the more expensive cutting oil, which heretofore had to be used, without reducing the cutting rates. This has been especially true when cutting ordinary cold rolled steels. Measurements have also indicated that with the applicator of this invention an increase of 15% to 20% in the fatigue life of a saw band is attained. This results from the fact that the band is better lubricated as it passes through its guides due to the great amount of coolant carried around on the band.

Again, because the coolant is so effectively introduced into the work piece, less heating occurs from the cutting action. This naturally means more power available for useful work.

And, finally, tests have demonstrated that the applicator of this invention is especially advantageous in cutting the harder alloys when cutting oil must be used as the coolant. Heretofore, under such conditions, and when using the conventional nozzle form of coolant application, the amount of smoke generated was so great that some type of forced exhaust ventilation had to be provided. With the applicator of this invention, however, and under exactly the same conditions, the amount of smoke generated is not enough to be objectionable in normal factory installations. Not only does this obviate the need for exhaust fans, but what is perhaps more important, it indicates that the applicator of this invention more effectually brings the coolant to the actual point of cutting action, since the reduction in smoke means that less heat is being generated and this in turn results in greater tool life and better surface finish.

What is claimed as our invention is:

1. In a power saw, the combination of: an endless flexible saw band which moves longitudinally in one direction through a work performing zone; means guiding and constraining the saw band to straight line movement through the work performing zone, comprising a pair of rigid spaced apart guides, one guide engaging the saw band closely adjacent to the point at which the band enters the work in the work performing zone and the other guide engaging the band a short distance beyond the work performing zone; means to apply liquid coolant to the saw band just before it enters the work comprising an applicator nozzle having spaced parallel portions at opposite sides of the saw band and extending across the full width of the band so that the nozzle embraces the band, said nozzle portions each having outlet means extending for the full width of the band, closely adjacent to and facing the band to discharge liquid coolant which is supplied to the nozzle onto all surfaces of the band including those at its toothed edge to thereby envelop the band with liquid coolant as it passes between said nozzle portions; means mounting the applicator nozzle between the two rigid saw guides in close juxtaposition to the point at which the band enters the work so that liquid coolant issuing from the nozzle is applied to the saw band after the band leaves the first guide and directly before it enters the work, whereby the liquid coolant enveloping the band is unrestrictedly carried by the band into the work; and duct means for connecting the applicator nozzle with a source of liquid coolant under pressure.

2. In a power saw, the structure set forth in claim 1 further characterized by the fact that the applicator nozzle is mounted on and carried by the rigid saw guide which is located ahead of the work performing zone; and further by the fact that the outer extremity of said nozzle is closed.

References Cited in the file of this patent

UNITED STATES PATENTS

| | | |
|---|---|---|
| 495,830 | Pake | Apr. 18, 1893 |
| 1,187,302 | Gorton | June 13, 1916 |
| 1,469,985 | Bath | Oct. 9, 1923 |
| 2,722,245 | Clampitt | Nov. 1, 1955 |
| 2,786,788 | Anderson | Mar. 26, 1957 |